United States Patent [19]

Wilkomirsky et al.

[11] Patent Number: 4,478,698

[45] Date of Patent: Oct. 23, 1984

[54] PROCESS FOR RECOVERING COPPER AND MOLYBDENUM FROM LOW GRADE COPPER CONCENTRATES

[75] Inventors: Igor Wilkomirsky; Andres Reghezza; Hector Petit-Laurent, all of Chuquicamata, Chile

[73] Assignee: Corporacion Nacional Del Cobre De Chile, Santiago, Chile

[21] Appl. No.: 567,876

[22] Filed: Jan. 3, 1984

[51] Int. Cl.³ .............................................. C25C 1/12
[52] U.S. Cl. ................................... 204/106; 204/108; 75/101 R; 75/101 BE; 75/115; 75/117; 75/109; 75/121; 423/54; 423/56
[58] Field of Search .................... 204/106–108; 423/54, 56; 75/101 R, 101 BE, 115, 117, 109, 121

[56] References Cited

U.S. PATENT DOCUMENTS 3,653,815  4/1972  Skarbo .................................. 423/56
3,834,893  9/1974  Queneau et al. ...................... 75/115
4,444,733  4/1984  Laferty et al. ........................ 423/61

OTHER PUBLICATIONS

Van den Steen, et al., "Hydrometallurgical Recovery of Molybdenum from Low Grade Molybdenite," presented at Molybdenum Symposium, Vancouver, B.C. Canada, Aug. 1977.

Primary Examiner—R. L. Andrews
Attorney, Agent, or Firm—Pennie & Edmonds

[57] ABSTRACT

Low grade copper concentrates containing molybdenum are roasted under conditions to form copper and molybdenum compounds which are soluble in dilute sulfuric acid solutions.

Molybdenum is then recovered by solvent extraction from these solutions and further precipitated as ammonium molybdate, while copper can be electrowinned or precipitated from the raffinate.

Overall recovery efficiencies are 96% for copper and 84% for molybdenum.

16 Claims, 1 Drawing Figure

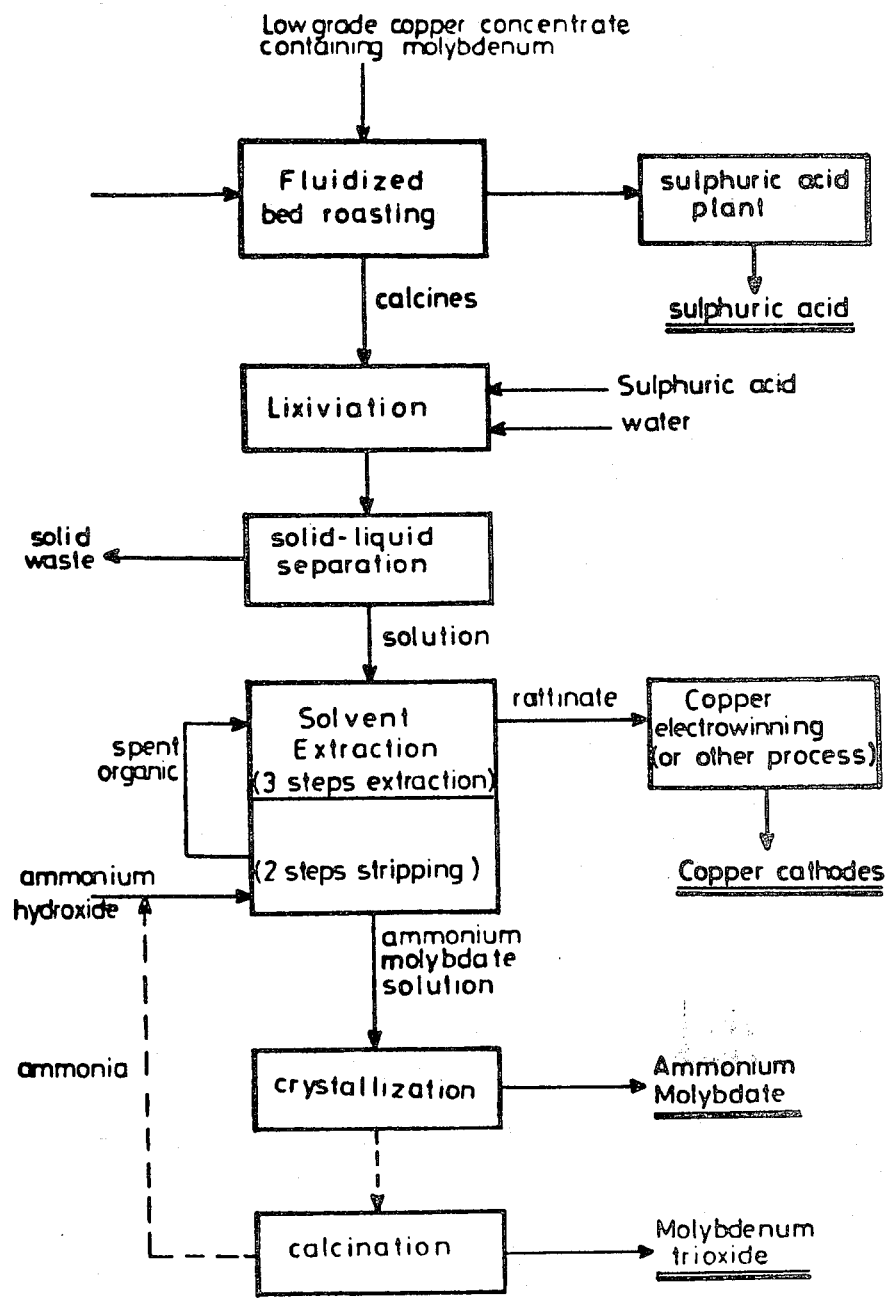
FIG. 1 GENERAL FLOW-SHEET OF THE PROCESS TO RECOVER COPPER AND MOLYBDENUM FROM LOW GRADE COPPER CONCENTRATE

PROCESS FOR RECOVERING COPPER AND MOLYBDENUM FROM LOW GRADE COPPER CONCENTRATES

DESCRIPTION

Technical Field

This invention relates to a process for extraction of copper and molybdenum from low grade ore concentrates of the copper mining industry. This process enables valuable metals to be recovered from an otherwise unuseable concentrate.

Background Art

At the present time, low grade copper concentrates are not treated by any special processes. These concentrates are usually recirculated to the concentrator circuits, where most of the fines containing molybdenum and copper are lost or smelted with the higher grade copper concentrates. In either situation, molybdenum is not recovered because it oxidizes or becomes incorporated into the slag.

Therefore, there are no known processes to specifically treat low copper concentrates containing varying amounts of molybdenum that is able to recover both copper and molybdenum residuals.

DESCRIPTION OF THE INVENTION

Applicants have now discovered and developed simple, novel, and useful process for recovering residual amounts of copper and molybdenum in high yield from low grade ore concentrates. Applicants' process does not require extensive equipment, nor does it require large amounts of energy to operate and, for these reasons, is expected to be commercially attractive to many mining and smelting operations.

The process of the present invention basically consists of the following steps:

1. roasting the concentrate under sulfation conditions to produce calcines,
2. leaching copper and molybdenum from the resulting calcines with a dilute sulfuric acid solution to form a pulp,
3. removing any solids from said pulp,
4. solvent extracting molybdenum from the pulp by treatment with a suitable solvent to form an organic phase and a raffinate,
5. stripping the molybdenum from said organic phase by washing with ammonium hydroxide and ammonium sulfate to form an ammonium molybdate solution,
6. precipitating the ammonium molybdate from said stripping solution,
7. crystallizing ammonium molybdate from said precipitate, and
8. recovering copper from said raffinate by conventional methods.

Typical low grade copper concentrates that have been treated successfully under this new process are described in Table 1. These ranges, however, are merely illustrative, as there is no theoretical limit on the content of copper or molybdenum in a concentrate that would preclude successful treatment and recovery when using this process.

TABLE 1

| TYPICAL LOW GRADE COPPER CONCENTRATES TREATED | |
|---|---|
| Element | Content (weight percent) |
| Copper | 8–20 |
| Iron | 10–22 |
| Molybdenum | 0.4–2.0 |
| Sulphur | 12–26 |
| Insolubles | 25–70 |

The particles size of concentrates treated ranged from 100%–100 mesh to 100%–325 mesh.

Each step of the process is described below in detail.

The ore concentrate is oxidized under sulfation roasting conditions at about 550° to 850° C., using an excess of up to about 200% air or oxygen enriched air over the stoichiometric, for a sufficient reaction time to produce calcines and achieve an off gas containing at least about 1% volume percent $SO_2$.

This reaction can be carried out in any suitable reactor, but a fluidized bed reactor is particularly appropriate. In this type reactor, the fluidizing gas velocity is preferably above about 20 cm/sec, the roasting is preferably performed at about 650° to 720° C., and the excess air or oxygen enriched air is preferably about 20 to 60% higher than the stoichiometric. The average reaction time of solids in the reactor can range from about 0.5 to 10 hours.

In the conventional practice of copper smelting, molybdenum is lost in the slag after oxidation. In the present process under the described roasting conditions, nearly 90% of contained molybdenum from the concentrate oxidizes and reacts readily with copper sulfate, oxysulfate and/or copper oxides to form acid-soluble copper molybdate calcines according to the general reactions listed below. (These equations assume that copper is present in the concentrate as covelite and molybdenum as molybdenite):

$$2MoS_2 + 7O_2 \rightarrow 2MoO_3 + 4SO_2$$

$$CuS + 2O_2 \rightarrow CuSO_4$$

$$4CuS + 7O_2 \rightarrow 2CuOxCuSO_4 + 2SO_2$$

$$2CuS + 3O_2 \rightarrow 2CuO + 2SO_2$$

$$CuO + MoO_3 \rightarrow CuMoO_4$$

$$CuOxCuSO_4 + MoO_3 \rightarrow CuMoO_4 + CuSO_4$$

$$Cu_2O + MoO_3 \rightarrow Cu_2MoO_4$$

$$3Cu_2O + 4MoO_3 \rightarrow Cu_6MO_4O_{15}$$

Other molybdate calcines such as $Cu_3Mo_2O_9$, $Cu_2MoO_5$, and $CaMoO_4$ can be formed, while the formation of soluble iron molybdates such as $Fe_2MoO_6$ and $FeMoO_4$ is avoided under the roasting conditions of this process. Similarly, other copper minerals such as chalcopyrite, chalcocite, etc. can form these molybdenum compounds.

The previously described reactions can occur by solid state reaction, or by heterogeneous reaction with gaseous $MoO_3$.

Calcium and magnesium in the concentrate react with $SO_2$ to form their stable sulfates, following the general reactions:

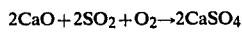

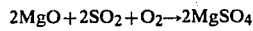

Virtually all the iron present in the concentrate oxidizes to hematite, $Fe_2O_3$, while any aluminum present forms aluminum oxide and/or aluminum sulfate. Any silica present in the concentrate remains unchanged.

When feeding the concentrate to the reactor, the form or condition of the concentrate has no effect on the metallurgical aspects of the process. If a slurry feed is used, the exothermic reactions of oxidation should furnish all the necessary thermal requirements to sustain the reaction as well as to vaporize water from the slurry. If necessary, additional heat can be supplied to maintain the reactor temperature.

When the reactor is charged with a dry feed, no additional heat is normally required and the roasting step is autothermal. It should be noted that typical dry feeds can have a moisture content of up to about 12 weight percent.

The calcines obtained from the previous step are subjected to a dilute sulfuric acid leaching solution, either by first cooling the calcines to ambient temperature or by directly introducing the calcines discharged from the reactor into the leaching solution.

The leaching solution contains about 2 to 10 volume percent of sulphuric acid at a temperature of 10° C. or higher. The desired weight percentage of solids in this solution should be sufficient to maintain an average reaction time in the leaching vessel of 0.2 to 10 hours. The leaching step can be carried out under a batch or continuous mode.

Under these leaching conditions, virtually all copper and most molybdenum enters into solution, with overall extraction efficiencies of up to 98% for copper and up to 88% for molybdenum.

After the leaching step, the resulting pulp is subjected to a conventional solid-liquid separation step to remove any solid particles.

In addition to the soluble copper and molybdenum compounds, the pulp contains minor amounts of impurities, such as iron, arsenic, magnesium, and aluminum, usually in a concentration of less than 0.5 grams per liter each. Typical ranges for these soluble materials are shown in Table 2.

TABLE 2

| TYPICAL SOLUTIONS | |
|---|---|
| Component | Concentration (grams/liter) |
| Copper | 30–40 |
| Molybdenum | 1–3 |
| Iron | 0.2–2.5 |
| Arsenic | 0.2–2.5 |
| Magnesium | 0.1–1.2 |
| Aluminum | 0.1–1.2 |

The pulp is then treated by at least one solvent extraction step to recover the dissolved molybdenum. This extraction step is conventional in all aspects. Any tertiary aliphatic amine, such as Alamine 336 from Henkel Corporation, can be used as an extractant. The organic/aqueous ratio to be used in the extraction step depends upon the molybdenum, ferric iron, and arsenic levels in the solution. The iron and arsenic impurities can be coextracted and could produce problems of coalescense in the stripping step if the improper ratio is used. Generally, this ratio can range from 1/10 to 1/1 depending upon the impurity content of the solution. The pH range for this extraction can be from 0 to 5, with 0.5 to 2 being preferred. Also, the extraction step can be repeated as many times as necessary to increase the recovery efficiency of the molybdenum. The time for each extraction step can range from 0.5 to 15 minutes. This step can be repeated a number of times as necessary to increase the molybdenum recovery efficiency, and three steps are preferred for optimum results.

Alternatively, the solution could be treated prior to the extraction step to reduce the ferric iron to the ferrous state, or to adjust the pH to precipitate any ferric iron or arsenic.

From the extraction step, a raffinate containing the copper is obtained along with an organic phase which contains the molybdenum. After several washing steps, the molybdenum is stripped from this organic phase with ammonium hydroxide and ammonium sulphate to obtain a concentrated ammonium molybdate solution. A typical concentration for each of these ammonium stripping compounds can be from about 5 to 200 g/l with about 30 to 60 g/l being preferred. The resulting pH range can be between about 8 and 14, with between about 10 and 12 being preferred.

The ratio of organic to solution can generally be between 5/1 to 1/5 with about 2/1 being preferred. This stripping step can be carried out for about 0.5 to 15 minutes with 2 to 5 minutes being preferred. Also, this step can be repeated for as many times as necessary to recover all the molybdenum, with at least 2 steps being preferred.

The ammonium molybdate solution obtained from the stripping step is crystallized by evaporation to obtain a high grade salt. If desired, the ammonium molybdate crystals can be calcined in an oxidizing atmosphere at 350°–600° C. to obtain molybdenum trioxide. Any ammonia generated by this heating can be recovered and recirculated into the circuit.

The raffinate containing the copper can be treated in any desired form to recover the copper. For example, it can be precipitated with iron or electrowinned, either being conventional in form.

The process described herein for the recovery of copper and molybdenum for low grade copper concentrates has the following advantages over the current practice:

a. The process recovers up to 84% of the residual molybdenum, while also recovering up to 96% of the residual copper from low grade concentrates.

b. The process requires no external energy in the roasting step, and this feature makes commercial use of the process attractive.

c. The process uses proven technology in each step.

d. Sulfuric acid can be manufactured from the off gases of the roasting step when the concentrate has a relatively high sulfur level.

Further benefits and advantages of the invention will become apparent from a consideration of the following description given with reference to the accompanying drawing (FIG. 1) which shows a general process flow diagram for this invention.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

EXAMPLES

The scope of the invention is further described in connection with the following examples which are set forth for purposes of illustration only and are not to be construed as limiting the scope of the invention in any manner.

EXAMPLE 1

A low grade copper concentrate of the following composition (given in percent by weight) was roasted in a fluidized bed reactor:

| | |
|---|---|
| Copper | 14.14 |
| Molybdenum | 1.98 |
| Iron | 16.58 |
| Sulfur | 19.21 |

The roasting conditions were as follows:

| | |
|---|---|
| Temperature | = 690 ± 10° C. |
| Average retention time of solids | = 3.2 hours |
| Excess air over stoichimetric | = 50% |
| Feed rate | = 3.4 mT/m$^2$/day |
| Feed moisture | = 4% |
| $SO_2$ in off gases | = 5.2 vol % |

The calcines obtained were leached as follows:

| | |
|---|---|
| Average lixivation time | = 2 hours |
| Temperature | = 15° C. (Ambient) |
| Solids | = 18 wt % |
| Acid ($H_2SO_4$) | = 5 vol % |

The efficiency of extraction for this process was 98% for the copper and 88% for molybdenum, with the resulting solutions containing 32 grams/liter of copper and 4 grams/liter of molybdenum.

The solution was further treated by solvent extraction under the following conditions:

| | |
|---|---|
| Extractant | = 7 wt % Alamine 336 and 2 wt % isodecanol with the balance being kerosene |
| Organic/aqueous ratio | = 1/5 |
| Extraction steps | = 3 |
| Retention time per step | = 3.5 minutes |
| Stripping Solution | = 50 g/l $NH_4OH$ and 50 g/l $(NH_4)_2SO_4$ |
| Organic/Aqueous ratio | = 2/1 |
| Stripping steps | = 2 |
| Retention time per step | = 4.5 minutes |

The ammonium molybdate solution was evaporated, obtaining dry crystals that were calcinated at 500° C. in air to yield a high grade molybdenum trioxide containing 99.2% $MoO_3$. Copper was electrowinned in conventional form to obtain copper cathodes. Overall recoveries were 96% for copper and 84% for molybdenum.

Having thus described our invention, what we claim as new and desire to secure by Letters Patent are:

1. A process to recover copper and molybdenum from low grade copper concentrates which contain variable levels of copper and molybdenum comprising:
    a. roasting the concentrates with air or oxygen enriched air at about 550 to 850 C. with up to about 200% excess air or oxygen enriched air over the stoichiometric, for sufficient reaction time to produce calcines and achieve an off gas containing at least about 1 volume percent $SO_2$,
    b. leaching copper and molybdenum from said calcines with a dilute sulfuric acid solution for about 0.2 to 5 hours to form a pulp,
    c. removing any solids from said pulp, to obtain a clear solution
    d. solvent extracting molybdenum from the solution by treatment with a suitable solvent to form an organic phase and a raffinate,
    e. stripping the molybdenum from said organic phase by washing with ammonium hydroxide and ammonium sulfate to form an ammonium molybdate solution,
    f. precipitating the ammonium molybdate from said stripping solution,
    g. crystallizing ammonium molybdate from said precipitate, and
    h. recovering copper from said raffinate by conventional methods.

2. The process according to claim 1 wherein the low grade copper concentrate containing molybdenum can be fed as a dry product with up to about 12 wt % moisture or as a slurry with about 20 to 80 wt % solids.

3. The process according to claim 1 wherein said roasting step is carried out in a fluidized bed reactor.

4. The process according to claim 3 wherein said roasting step is performed at about 650° to 720° C. with an excess air of about 20 to 60%, a fluidized gas velocity of above about 20 cm/sec, and an average retention time of the solids in the reactor of about 0.5 to 10 hrs.

5. The process according to claim 4 wherein said off gas has a sufficiently high $SO_2$ concentration so that it can be used in the manufacture of sulfuric acid.

6. The process according to claim 1 wherein the calcines produced in the roasting step are directly introduced into a leaching solution of a concentration of 2 to 10 vol % sulfuric acid, at a temperature of at least 10° C., either by a continuous or batch mode, for 0.2 to 10 hours.

7. The process according to claim 6 wherein said leaching step is performed continuously at a temperature of 10° to 20° C. with a solution of 5 vol % sulfuric acid for 1 to 3 hours.

8. The process according to claim 1 wherein the calcines produced in the roasting step are first cooled to ambient temperature before being introduced into said leaching solution.

9. The process according to claim 1 wherein the pulp obtained from said leaching step is submitted to a solid-liquid separation step to remove any solids and obtain a solution containing substantially all of the copper and molybdenum in solution.

10. The process according to claim 1 wherein said solvent extraction step is performed with a tertiary aliphatic amine as extractant, a ratio of organic/aqueous of 1/10 to 1/1, and a pH range of 0 to 5 with at least one or more extraction steps of 0.5 to 15 minutes each.

11. The process according to claim 10 wherein said solvent extraction step is performed with an organic- /aqueous ratio of 1/5, a pH range of 0.5 to 2, and at least 3 extraction steps of 1 to 5 minutes each.

12. The process according to claim 1 wherein said stripping step is performed with a solution of about 5 to 200 g/l each of ammonium hydroxide and ammonium sulfate at a pH range of 8 to 14 with a ratio of organic/solution of 5/1 to 1/5 with at least 1 stripping step having a retention time of 0.5 to 15 minutes per step.

13. The process according to claim 12 wherein said ammonium compounds are present in a concentration of about 30 to 60 g/l each at a pH range of 10 to 12 with a ratio of organic/solution of 2/1, with at least 2 stripping steps having a retention time per stripping step of 2 to 5 minutes.

14. The process according to claim 1 wherein the precipitated ammonium molybdate from the solution of the stripping step is crystallized by vaporization of water to obtain ammonium molybdate crystals.

15. The process according to claim 14 wherein the ammonium molybdate crystals are calcined at 500° C. or above in air or oxygen enriched air, to obtain molybdenum trioxide.

16. The process according to claim 1 wherein the copper compounds contained in the raffinate of the solvent extraction step are recovered by electrowinning, precipitation with iron, or any other conventional route.

* * * * *